(12) United States Patent
Killilea

(10) Patent No.: US 9,803,045 B2
(45) Date of Patent: Oct. 31, 2017

(54) AQUEOUS COATING COMPOSITIONS CONTAINING ACETOACETYL-FUNCTIONAL POLYMERS, COATINGS, AND METHODS

(75) Inventor: T. Howard Killilea, North Oaks, MN (US)

(73) Assignee: VALSPAR SOURCING, INC., Minneapolis, MN (US)

( * ) Notice: Subject to any disclaimer, the term of this patent is extended or adjusted under 35 U.S.C. 154(b) by 861 days.

(21) Appl. No.: 11/300,070

(22) Filed: Dec. 14, 2005

(65) Prior Publication Data

US 2006/0135684 A1  Jun. 22, 2006

Related U.S. Application Data

(60) Provisional application No. 60/636,921, filed on Dec. 17, 2004.

(51) Int. Cl.
*C08L 31/00* (2006.01)
*C08G 18/08* (2006.01)
*C08G 18/67* (2006.01)
*C09D 133/14* (2006.01)
*C09D 175/16* (2006.01)

(52) U.S. Cl.
CPC ....... *C08G 18/0823* (2013.01); *C08G 18/672* (2013.01); *C09D 133/14* (2013.01); *C09D 175/16* (2013.01)

(58) Field of Classification Search
CPC . C09D 133/14; C09D 133/06; C08L 2666/06; C08L 33/02
USPC .......... 524/253, 556, 558; 106/14.11, 14.13; 525/123
See application file for complete search history.

(56) References Cited

U.S. PATENT DOCUMENTS

| | | | |
|---|---|---|---|
| 3,380,831 A | | 4/1968 | Cohen et al. |
| 3,935,173 A | | 1/1976 | Ogasawara et al. |
| 4,782,109 A | | 11/1988 | DuLaney et al. |
| 4,839,413 A | * | 6/1989 | Kiehlbauch et al. ......... 524/460 |
| 4,908,229 A | | 3/1990 | Kissel |
| 5,296,530 A | * | 3/1994 | Bors et al. ................... 524/558 |
| 5,362,798 A | | 11/1994 | Hayes |
| 5,453,449 A | | 9/1995 | Stefan et al. |
| 5,484,849 A | * | 1/1996 | Bors ...................... C08F 220/28 524/398 |
| 5,534,310 A | * | 7/1996 | Rokowski .......... C09D 133/062 427/494 |
| 5,559,192 A | | 9/1996 | Bors et al. |
| 5,562,953 A | * | 10/1996 | Bors et al. .................... 427/558 |
| 5,643,977 A | | 7/1997 | Sho et al. |
| 5,798,426 A | | 8/1998 | Anton et al. |
| 5,962,571 A | | 10/1999 | Overbeek et al. |
| 6,048,471 A | | 4/2000 | Henry |
| 6,297,320 B1 | * | 10/2001 | Tang et al. ................... 525/107 |
| 6,297,328 B1 | | 10/2001 | Collins et al. |
| 6,555,625 B1 | * | 4/2003 | Overbeek et al. ............ 525/191 |
| 6,649,679 B1 | * | 11/2003 | Stockl et al. ................. 524/253 |
| 2003/0055171 A1 | | 3/2003 | Overbeek et al. |
| 2004/0161542 A1 | * | 8/2004 | Ziemann et al. .......... 427/385.5 |
| 2005/0131176 A1 | | 6/2005 | Zhao |
| 2006/0135686 A1 | | 6/2006 | Killilea et al. |
| 2006/0234157 A1 | | 10/2006 | Bouwkamp-Wijnoltz et al. |
| 2007/0110981 A1 | | 5/2007 | Killilea et al. |
| 2007/0238827 A1 | * | 10/2007 | Brady et al. .................. 524/556 |
| 2007/0259166 A1 | | 11/2007 | Killilea et al. |
| 2007/0259188 A1 | | 11/2007 | Wu et al. |
| 2007/0269660 A1 | | 11/2007 | Killilea et al. |
| 2007/0282046 A1 | | 12/2007 | Killilea et al. |
| 2008/0008895 A1 | | 1/2008 | Garner et al. |
| 2008/0199725 A1 | | 8/2008 | Vetter et al. |
| 2008/0305427 A1 | | 12/2008 | Sanada et al. |

FOREIGN PATENT DOCUMENTS

| | | | | |
|---|---|---|---|---|
| CA | | 814528 | 6/1969 | |
| EP | | 486 278 | 5/1992 | |
| EP | | 0 697 417 A1 | 2/1996 | |
| EP | | 0 697 444 A1 | 2/1996 | |
| EP | | 0705855 A | 4/1996 | |
| EP | | 0 736 573 A2 | 10/1996 | |
| EP | | 0 697 417 B1 | 5/1999 | |
| EP | WO 2004/003074 | * | 1/2004 | ............. C08L 33/04 |
| GB | | 1107249 A | 3/1968 | |
| JP | SHO 54-38323 | | 3/1979 | |
| JP | | 2662673 B2 | 9/1999 | |
| SU | | 833892 | 5/1981 | |
| WO | WO 93/16133 A2 | | 8/1993 | |

(Continued)

OTHER PUBLICATIONS

International Preliminary Report on Patentability for PCT/US2007/002604 (6 pgs).
American Society of Testing Materials, ASTM Designation: D 523-89 (Reapproved 1999), "Standard Test Method for Specular Gloss;" 5 pgs.
American Society of Testing Materials, ASTM Designation: D 5402-93 (Reapproved 1999), "Standard Practice for Assessing the Solvent Resistance of Coatings Using Solvent Rubs;" 3 pgs.
Eastman Chemical Company. Publication N-319C, Kingport, TN., Dec. 1999, Title Page, Table of Contents, "Acetoacetoxyethyl Methacrylate (AAEM) Acetoacetyl Chemistry," pp. 1-11.
Koleske et al., "2003 Additives Guide," *Paint and Coatings Industry*, Apr. 2003, pp. 12-86.
U.S. Federal Register, Jun. 16, 1995, vol. 60, No. 116, pp. 31633-31637.
Witzeman, et al., "Comparison of Methods for the Preparation of Acetoacetylated Coating Resins," 1990, *Journ. of Coatings Technology*, vol. 62, 789:101-112.

(Continued)

*Primary Examiner* — Michael A Salvitti
(74) *Attorney, Agent, or Firm* — Mueting, Raasch & Gebhardt, P.A.

(57) ABSTRACT

Aqueous coating compositions that include polymers having one or more of the following acetoacetyl-functional groups:

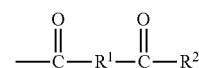

wherein $R^1$ is a C1 to C22 alkylene group and $R^2$ is a C1 to C22 alkyl group.

33 Claims, No Drawings

(56) References Cited

FOREIGN PATENT DOCUMENTS

| | | | |
|---|---|---|---|
| WO | WO 95/16749 A1 | 6/1995 |
| WO | WO 00/56826 A | 9/2000 |
| WO | WO 2006/065914 A1 | 6/2006 |
| WO | WO 2007/059516 A1 | 5/2007 |
| WO | WO 2007/087458 A1 | 8/2007 |
| WO | WO 2007/089807 A2 | 8/2007 |
| WO | WO 2007/089807 A3 | 8/2007 |
| WO | WO 2007/089913 A1 | 8/2007 |
| WO | WO 2007/090131 A1 | 8/2007 |
| WO | WO 2007/090132 A1 | 8/2007 |
| WO | WO 2007/137233 A1 | 11/2007 |
| WO | WO 2007/143622 A1 | 12/2007 |
| WO | WO 2008/006109 A1 | 1/2008 |

OTHER PUBLICATIONS

Zeno W. Wicks, Jr., et al., *Organic Coatings, Science and Technology*, Second Edition, (Wiley-Interscience, New York, 1999), Title Page, Copyright Page, Chapter 8, "Latexes," p. 143.
International Preliminary Report on Patentability and Written Opinion for PCT/US2005/045265 (6 pgs).
International Search Report and Written Opinion for PCT/US2007/002604 (9 pgs).
U.S. Appl. No. 11/342,412, filed Jan. 30, 2006, Killilea et al.
Clemens, "A Comparison of Catalysts for Crosslinking Acetoacetylated Resins via the Michael Reaction[1]," Water-Borne & Higher-Solids Coatings Symposium, University of Southern Mississippi Department of Polymer Science and Southern Society for Coatings Technology, New Orleans, LA, Feb. 3-5, 1988; pp. 55-67.
Clemens et al., "Comparison of Catalysts for Crosslinking Acetoacetylated Resins via the Michael Reaction," *Journal of Coatings Technology*, Mar. 1989; 61(770):83-91.
Del Rector et al., "Application for Acetoacetyl Chemistry in Thermoset Coatings," *Journal of Coatings Technology*, Apr. 1989; 61(771):31-37.
Lewis, et al., "Luminescence," *Hawley's Condensed Chemical Dictionary*, 14th Ed., 2002, John Wiley and Sons, Inc., retrieved from Knovel® Online; 1 page.
Mexican Office Action dated May 19, 2009 for Mexican Patent Application No. MX/a/2007/006083; 4 pgs.
"Photoinitiators for UV Curing," "Darocur 1173", p. 2; Ciba Specialty Chemicals; no date available; 8 pgs. total.
Chinese Office Action dated Apr. 24, 2009 for Chinese Patent Application No. 200580039806.0; 4 pgs.
European Office Action dated Jul. 10, 2009 for European Patent Application No. 07 762 436.9-2109; 2 pgs.
Office Action dated Dec. 11, 2008 for U.S. Appl. No. 11/342,412; 19 pgs.
Office Action dated May 29, 2009 for U.S. Appl. No. 11/342,412; 13 pgs.
"Polymerization," Wikipedia [online]. [retrieved on Sep. 9, 2008]. <URL:http://en.wikipedia.org/wiki/Polymerization>; 3 pgs.
"Step-growth polymerization," Wikipedia [online]. [retrieved on Sep. 9, 2008]. <URL:http://en.wikipedia.org/wiki/Condensation_polymerization>; 2 pgs.
Vietnamese Notification on the Result of Preliminary Examination dated Oct. 14, 2008 for Vietnamese Patent Application No. 1-2008-02164; 2 pgs.
Whelan, *Polymer Technology Dictionary*, Chapman & Hall, London, UK, 1994; title pages, publisher's page, and pp. 70, 350, and 413; 5 pgs. total.
Communication of a notice of opposition dated Nov. 23, 2009, for European Application No. 05854052.7; opposition filed by BASF; 35 pages. German language document. English translation included; 29 pages.
Communication to the Division of Opposition dated Feb. 6, 2004, for European Application No. 96400730.6; 2 pages. French language document. English translation included; 2 pages.

"VOC-Richtlinie," Römpp Online, Version 3.4; copyright 2009. Available online at <www.roempp.com>; 1 page. German language document. English translation included; 1 page.
Communication of a notice of opposition dated Nov. 23, 2009, for European Application No. 05854052.7; opposition filed by Akzo; 8 pages.
Drexler and Sell, "VOC Regulation in Europe and NAFTA," 2002 *Eur. Coat. J.* 4:408-414.
Blanchard et al., "Studies of Alkali-Soluble Resins and Their Use As Stabilisers in Emulsion Polymerisation" Poster Abstract, UK Polymer Colloids Forum, Tenth Forum, Apr. 2005, retrieved online Nov. 2, 2010 at <URL:http://www.uk-pcf.org/Forum%20meeting%20abstracts/pcf%2010/Blanchard.pdf>, 1 pg.
"Luminescene" Hawley's Condensed Chemical Dictionary, 14th Edition. 2002 John Wiley and Sons, Inc. KnovelOnline. 1 page.
Office Action dated Oct. 8, 2009 for U.S. Appl. No. 11/342,412. 9 pgs.
Office Action dated Feb. 19, 2010 for U.S. Appl. No. 11/342,412. 10 pgs.
Office Action dated Aug. 2, 2010 for U.S. Appl. No. 11/342,412. 17 pgs.
Office Action from Australia Patent Office, dated Jun. 7, 2010 for Patent Application No. 2005317129. 3 pgs.
Office Action from China Patent Office, dated Oct. 30, 2009, for Patent Application No. 200580039806.0. 4 pgs. (English Translation, 2 pgs).
Office Action from China Patent Office, dated Aug. 4, 2010, for Patent Application No. 200580039806.0. 5 pgs. (English Translation, 3 pgs).
Office Action from China Patent Office, dated Jul. 27, 2010 for Patent Application No. 200780003808.3. 3 pgs. (English Translation, 2 pgs).
Office Action from Mexican Patent Office, dated Apr. 8, 2010 for Patent Application No. MX/a/2007/006083 (English Translation, 3 pgs.).
Office Action from Mexican Patent Office, dated Oct. 21, 2009 for Patent Application No. MX/a/2007/006083 (English Translation, 4 pgs.).
Office Action dated Jan. 20, 2011 for U.S. Appl. No. 11/342,412. 14 pgs.
Advisory Action dated May 9, 2011 for U.S. Appl. No. 11/342,412. 9 pgs.
Office Action from China Patent Office, dated Dec. 23, 2011, for Patent Application No. 200580039806.0. 5 pgs. (No English Translation available.).
Communication from European Patent Office dated Oct. 27, 2010 in Opposition of EP Patent No. 1 833 933; Application No. 05 854 052.7. 4 pgs.
Communication from European Patent Office dated Mar. 7, 2011 in Opposition of EP Patent No. 1 833 933, Application No. 05 854 052.7, forwarding Letter of Opponent 01 (Akzo Nobel) dated Feb. 24, 2011 (citing "Latex," Römpp Lexikon Lacke und Druckfarben, Georg Thieme Verlag, Stuttgart, Germany, 1998, pp. 350-351, title, and copyright pages). 7 pgs.
Communication from European Patent Office dated Mar. 10, 2011 in Opposition of EP Patent No. 1 833 933, Application No. 05 854 052.7, forwarding Letter of Opponent 02 (BASF) dated Mar. 4, 2011 (citing "VOC," Römpp Lexikon Chemie, Georg Thieme Verlag, Stuttgart, Germany, 1999, p. 4890, title, and copyright pages; and European Coatings Journal, Feb. 2004, p. 400 and cover page.). 11 pgs.
"Darocur® photoinitiators for UV cured coatings," BASF SE, Ludwigshafen, Germany, copyright 2011, retrieved on Jul. 29, 2011. Retrieved from the Internet: <http://www.basf.com/group/corporate/en/brand/DAROCUR>; 2 pgs.
Office Action dated Aug. 1, 2011 for U.S. Appl. No. 11/342,412. 17 pgs.
Office Action from Australian Patent Office, dated Oct. 11, 2011, for Patent Application No. 2007208166. 3 pgs.
Office Action from China Patent Office, dated May 30, 2011, for Patent Application No. 200580039806.0. 7 pgs.

(56) References Cited

OTHER PUBLICATIONS

Interlocutory Decision in the Opposition Proceedings; issued on Mar. 7, 2013, in regard to the Opposition of EP 1833933 (application No. 05854052.7); 33 pages.
Minutes of the Oral Proceedings before the Opposition Division; issued on Mar. 7, 2013, in regard to the Opposition of EP 1833933 (application No. 05854052.7); 46 pages.
Patentee's response to the Communication of the Opposition Division; filed on Aug. 8, 2011, in regard to the Opposition of EP 1833933 (application No. 05854052.7); 11 pages.
Patentee's Written Submission filed in preparation of the Oral Proceedings; filed on Dec. 21, 2012, in regard to the Opposition of EP 1833933 (application No. 05854052.7); 54 pages.
Exhibit 1. Appendix: Experimental Results. Cited in Opposition of European Patent No. 1 833 933 (05 85 4052.7). 7 pages.
Hamielec et al., Ullmann's Encyclopedia of Industrial Chemistry, Polymerization Process, 1. Fundamentals, 2012, vol. 29, 129-172, Wiley-VCH Verlag GmbH & Co. KGaA, Weinheim, Germany.

\* cited by examiner

AQUEOUS COATING COMPOSITIONS CONTAINING ACETOACETYL-FUNCTIONAL POLYMERS, COATINGS, AND METHODS

This application claims the benefit of the U.S. Provisional Application No. 60/636,921, filed Dec. 17, 2004, which is incorporated by reference in its entirety.

BACKGROUND

There is a significant need for lower VOC-containing (volatile organic compound-containing) and formaldehyde-free systems in the coatings industry due to increasing environmental restrictions. Aqueous-based thermoplastic coatings, such as latexes can be applied with low levels of solvents and formaldehyde, but they do not have the hardness and chemical resistance required for many applications. Chemically crosslinked coatings, such as aqueous-based melamine cured coatings, that give good block and chemical resistance contain low levels of formaldehyde. For interior applications such as coatings for kitchen cabinets, however, many consumers desire "Green" systems, which are carcinogen free. Other crosslinking technologies such as blocked isocyanates or ethylenically unsaturated compounds also achieve the desired performance; however, these technologies are often cost prohibitive or highly irritating either to skin, eyes, or both.

Thus, what is needed are coating compositions that have one or more of the following properties: high performance, low VOC levels, substantially no formaldehyde content, and low irritation levels.

SUMMARY

The present invention provides aqueous coating compositions that include polymers having one or more of the following acetoacetyl-functional groups:

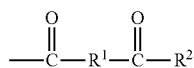

wherein $R^1$ is a C1 to C22 alkylene group and $R^2$ is a C1 to C22 alkyl group. Preferably, $R^1$ is a C1 to C4 alkylene group and $R^2$ is a C1 to C4 alkyl group, and more preferably, $R^1$ is methylene (—$CH_{12}$—) and $R^2$ is methyl (—$CH_3$).

Such functionalized polymers are desirable because they can become part of a crosslinked network, thereby providing advantageous coating properties. Preferred compositions also possess one or more of the following properties: low VOC levels, substantially no formaldehyde content, high performance, and low irritation levels.

Such coating compositions can be coated onto a substrate and dried (e.g., cured), as with a paint, for example. Desirable performance characteristics of the coating include chemical resistance, abrasion resistance, hardness, gloss, reflectivity, appearance, or combinations of these characteristics, and other similar characteristics. Polymers having one or more acetoacetyl-functional groups as described above can be latex polymers or water-dispersible polymers.

Preferred coating compositions include no more than 10 weight percent (wt-%) (more preferably, no more than 7 wt-%) volatile organic compounds (VOC), based on the total weight of the composition.

Preferred acetoacetyl-functional polymers include an acetoacetyl-functional polyurethane, epoxy, polyamide, chlorinated polyolefin, acrylic, oil-modified polymer, polyester, or mixtures or copolymers thereof. Preferably, acetoacetyl-functional polymers are prepared at a pH no more than 8.5, more preferably no more than a pH of 8.0, and most preferably at a pH no more than 7.8. In certain embodiments, the acetoacetyl-functional polymer is an acetoacetyl-functional latex polymer. Preferably, the acetoacetyl-functional latex polymer includes latex particles having an average particle size (i.e., the average of the longest dimension of the particles, typically, a diameter) of less than 75 nm as measured by a Coulter N4 Plus.

In addition to polymers having acetoacetyl functionality, coating compositions of the present invention also include ethylenically unsaturated compounds that are distinct from the acetoacetyl-functional polymers. Such compounds may be monomers, oligomers, polymers, or mixtures thereof. Preferred such ethylenically unsaturated compounds include (meth)acrylate functionality (wherein "(meth)acrylate" refers to an acrylate and a methacrylate), vinyl ether functionality, (meth)allyl ether functionality (wherein (meth)allyl ether refers to an allyl ether and a methallyl ether), or mixtures thereof. Preferably, the ethylenically unsaturated compound includes (meth)acrylate functionality. Examples of (meth)acrylate-functional compounds include those selected from the group consisting of isobornyl (meth)acrylate, isodecyl (meth)acrylate, phenoxyethyl (meth)acrylate, trimethylolpropane tri(meth)acrylate, trimethylolpropane ethoxylate tri(meth)acrylate, tripropylene glycol di(meth)acrylate, hexanediol di(meth)acrylate, tetrahydrofurfuryl (meth)acrylate, beta-carboxyethyl (meth)acrylate, bisphenol A ethoxylate di(meth)acrylate, ethoxylated and propoxylated neopentyl glycol di(meth)acrylates, di-(trimethylolpropane tetra (meth)acrylate), pentaerythritol tri(meth)acrylate, pentaerythritol tetra(meth)acrylate, and mixtures thereof.

The present invention also provides methods for coating that involve applying a coating composition to a substrate and allowing the coating composition to harden (e.g., by exposing the coating composition to radiation such as ultraviolet or visible light).

In one embodiment, a preferred method includes: providing a coating composition that includes: water; a polymer that includes one or more acetoacetyl-functional groups of the formula:

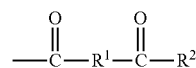

wherein $R^1$ is a C1 to C22 alkylene group and $R^2$ is a C1 to C22 alkyl group; and a (meth)acrylate functional compound distinct from the polymer having acetoacetyl functionality; optionally an initiator (preferably a photoinitiator); applying the coating composition to a substrate surface; and at least partially curing the coating composition.

In another embodiment, the method includes: providing a coating composition that includes: water; a polymer including one or more acetoacetyl-functional groups of the formula:

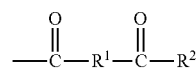

wherein $R^1$ is a C1 to C22 alkylene group and $R^2$ is a C1 to C22 alkyl group; and an ethylenically unsaturated compound distinct from the polymer having acetoacetyl functionality; a photoinitiator; applying the coating composition to a substrate surface; and applying ultraviolet or visible light to the coating composition to at least partially cure the coating composition.

The present invention also provides coatings prepared or preparable from the coating compositions described herein. For example, a coating of the present invention is preparable by a method that involves applying a coating composition of the present invention to a substrate and allowing the coating composition to harden (e.g., by exposing the coating composition to radiation such as ultraviolet or visible light).

Preferred coatings are cured by exposing the coating to radiation having a wavelength in the range of $10^{-3}$ to about 800 nm. More preferably, coating compositions of the present invention are exposed to ultraviolet or visible light in the range of about 200 nm to 800 nm. Coating compositions of this invention may also be cured by thermal means or other forms of radiation such as, for example, electron beam.

Preferred coatings, which are designed to be cured by ultraviolet or visible light, are preferably exposed to 100 Mjoules/cm$^2$ to 5000 Mjoules/cm$^2$, more preferably exposed to 300 Mjoules/cm$^2$ to 2000 Mjoules/cm$^2$, and even more preferably exposed to 500 Mjoules/cm$^2$ to 1750 Mjoules/cm$^2$.

As used here, a "latex" polymer means a dispersion of polymer particles in water; a latex polymer typically requires a secondary dispersing agent (e.g., a surfactant) for creating a dispersion or emulsion of polymer particles in water.

A "water-dispersible" polymer means the polymer is itself capable of being dispersed into water (i.e., without requiring the use of a separate surfactant) or water can be added to the polymer to form a stable aqueous dispersion (i.e., the dispersion should have at least one month shelf stability at normal storage temperatures). Such water-dispersible polymers can include nonionic or anionic functionality on the polymer, which assist in rendering them water-dispersible. For such polymers, external acids or bases are typically required for anionic stabilization.

Also herein, "a," "an," "the," "at least one," and "one or more" are used interchangeably.

Also herein, the recitations of numerical ranges by endpoints include all numbers subsumed within that range (e.g., 1 to 5 includes 1, 1.5, 2, 2.75, 3, 3.80, 4, 5, etc.).

Also herein, the terms "comprises" and variations thereof do not have a limiting meaning where these terms appear in the description and claims. Thus, a composition comprising an ethylenically unsaturated compound means that the composition includes one or more of the ethylenically unsaturated compounds.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

The present invention is directed to aqueous coating compositions (e.g., paints) that include acetoacetyl functional polymers and ethylenically unsaturated compounds (monomers, oligomers, polymers, or mixtures thereof), coatings prepared therefrom, and methods of making and using. In some embodiments, the ethylenically unsaturated compounds are (meth)acrylate functional compounds.

Such polymers include one or more of the following acetoacetyl-functional groups:

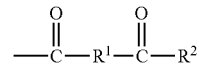

wherein $R^1$ is a C1 to C22 alkylene group and $R^2$ is a C1 to C22 alkyl group. Preferably, $R^1$ is a C1 to C4 alkylene group and $R^2$ is a C1 to C4 alkyl group, and more preferably, $R^1$ is methylene (—CH$_2$—) and $R^2$ is methyl (—CH$_3$).

The amount of acetoacetyl functionality in such a polymer is preferably at least 0.5%, more preferably at least 2.5%, and most preferably at least 5%. The amount of acetoacetyl functionality in such a polymer is preferably no more than 60%, more preferably no more than 40%, and most preferably no more than 30%.

In certain embodiments the invention relates to a radiation-curable coating composition. More particularly, in certain preferred embodiments, the invention relates to an aqueous-based, ultraviolet ("UV") radiation-curable coating composition containing an acetoacetyl-functional polymer and an acrylate or methacrylate functional (preferably, multifunctional) compound. Such coatings can also be cured via visible light, electron beam, thermal initiation, or cationic initiation.

In certain embodiments the invention relates to an ultraviolet curable coating composition. More particularly, in certain preferred embodiments, the invention relates to an aqueous-based, ultraviolet ("UV") radiation-curable coating composition containing an acetoacetyl-functional polymer, an ethylenically unsaturated functional compound, and a photoinitiator.

In certain embodiments, coating compositions of the present invention are advantageous in that they have a relatively low volatile organic content without sacrificing the balance of properties desired for an applied (i.e., dry) coating, such as a paint. Preferably, certain coating compositions have a relatively low volatile organic content (VOC). Preferably, the coating compositions include no more than 10 weight percent (wt-%) volatile organic compounds, based on the total weight of the composition. More preferably, the coating compositions of the present invention include no more than 7 wt-% volatile organic compounds. Volatile organic compounds are defined in U.S. Pat. No. 6,048,471 (Henry) and in the U.S. Federal Register: Jun. 16, 1995, volume 60, number 111.

Coating compositions of the present invention preferably include at least 40 wt-% water, based on the total weight of the composition. Coating compositions of the present invention preferably include no more than 90 wt-% water, and more preferably no more than 70 wt-% water, based on the total weight of the composition.

Polymers suitable for the coating compositions of the present invention are preferably either water-dispersible or latex polymers. Such polymers are well-known in the coating industry and include a wide variety of polymers.

In certain embodiments, suitable polymers include polyurethanes, epoxies, polyamides, chlorinated polyolefins, acrylics, oil-modified polymers, polyesters, and mixtures or copolymers thereof, for example. Such polymers are readily synthesized and made to include acetoacetyl functionality using conventional techniques.

Acetoacetyl functionality may be incorporated into the polymer through the use of: acetoacetoxyethyl acrylate, acetoacetoxypropyl methacrylate, allyl acetoacetate, acetoacetoxybutyl methacrylate, 2,3-di(acetoacetoxy)propyl methacrylate, 2-(acetoacetoxy) ethyl methacrylate, t-butyl acetoacetate, diketene, and the like, or combinations thereof. In general, any polymerizable hydroxy functional or other active hydrogen containing monomer can be converted to the corresponding acetoacetyl functional monomer by reaction with diketene or other suitable acetoacetylating agent (see, e.g., Comparison of Methods for the Preparation of Acetoacetylated Coating Resins, Witzeman, J. S.; Dell Nottingham, W.; Del Rector, F. J. Coatings Technology; Vol. 62, 1990, 101 (and references contained therein)). In preferred coating compositions, the acetoacetyl functional group is incorporated into the polymer via 2-(acetoacetoxy) ethyl methacrylate, t-butyl acetoacetate, diketene, or combinations thereof.

In certain embodiments, the acetoacetyl-functional polymer of the composition is a latex polymer. Preferably, the acetoacetyl-functional latex polymer particles have an average particle size of less than 75 nanometers (nm).

In certain embodiments, the acetoacetyl functional latex polymer is preferably prepared through chain-growth polymerization, using, for example, 2-(acetoacetoxy) ethylmethacrylate (AAEM) and one or more ethylenically unsaturated monomers. Examples of ethylenically unsaturated monomers are selected from the group consisting of acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidylether, acrylamide, methylacrylamide, styrene, α-methyl styrene, vinyl toluene, vinyl acetate, vinyl propionate, allyl methacrylate, and mixtures thereof.

Preferably, the ethylenically unsaturated monomers used in preparing the acetoacetyl-functional latex polymer include styrene. In certain embodiments, the acetoacetyl-functional latex polymer includes no greater than 75 percent by weight (wt-%) styrene, and in other embodiments, no greater than 50 wt-%, based on the total weight of the acetoacetyl-functional latex polymer. In certain embodiments, the level of styrene is no less than 7.5 wt-%, in other embodiments, no less than 20 wt-%, based on the total weight of the acetoacetyl-functional latex polymer.

The latex polymers are typically stabilized by one or more nonionic or anionic emulsifiers (i.e., surfactants), used either alone or together. Examples of suitable nonionic emulsifiers include tert-octylphenoxyethylpoly(39)-ethoxyethanol, dodecyloxypoly(10)ethoxyethanol, nonylphenoxyethylpoly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20) ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene (20)lauramide, N-lauryl-N-polyoxyethylene(3)amine, and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$-$C_{16}$) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate. Various combinations of emulsifiers can be used, if desired.

The latex polymer may also be stabilized with an alkali-soluble polymer. Alkali-soluble polymers may be prepared by making a polymer with acrylic or methacrylic acid or other polymerizable acid monomer (usually greater than 10%) and solubilizing the polymer by addition of ammonia or other base. The alkali-soluble polymer may contain acetoacetyl functionality. Examples of suitable alkali-soluble support polymers are JONCRYL 675 and JONCRYL 678.

A water-soluble free radical initiator is typically used in the chain growth polymerization of a latex polymer. Suitable water-soluble free radical initiators include hydrogen peroxide, tert-butyl peroxide, alkali metal persulfates such as sodium, potassium and lithium persulfate, ammonium persulfate, and mixtures of such initiators with a reducing agent. Reducing agents include sulfites, such as alkali metal metabisulfite, hydrosulfite, and hyposulfite, sodium formaldehyde sulfoxylate, and reducing sugars such as ascorbic acid and isoascorbic acid. The amount of initiator is preferably from 0.01 wt-% to 3 wt-%, based on the total amount of monomer. In a redox system the amount of reducing agent is preferably from 0.01 wt-% to 3 wt-%, based on the total amount of monomer. The temperature may be in the range of 10° C. to 100° C.

In certain embodiments, the acetoacetyl-functional polymer of the composition is a water dispersible polymer. Preferred acetoacetyl-functional water dispersible polymers include alkyds, polyesters, and polyurethanes. Such polymers may be prepared by any method known in the art.

An example of a method of preparing a water-dispersible polyester includes reacting one or more polybasic acids with one or more polyols to give a polymer with excess hydroxyl functionality. The resulting polyester could be further reacted with either t-butyl acetoacetate, or diketene to incorporate acetoacetyl-functionality onto the polymer, and with a suitable anhydride such as trimellitic anhydride to render the polyester acid functional. The resulting acid functionality may then be neutralized with a neutralizing base to render the polyester water dispersible.

An example of a method of preparing a water-dispersible alkyd includes reacting one or more of the alcoholysis product of an oil and polyol, fatty acids, monoglycerides or diglycerides and one or more polybasic acids with one or more polyols to give a polymer with excess hydroxyl functionality. The resulting alkyd could be further reacted with either t-butyl acetoacetate, or diketene to incorporate acetoacetyl-functionality onto the polymer, and with a suitable anhydride such as trimellitic anhydride to render the alkyd acid functional. The resulting acid functionality may then be neutralized with a neutralizing base to render the alkyd water dispersible.

Suitable oils and/or fatty acids derived therefrom include compounds such as, for example, linseed oil, safflower oil, tall oil, cotton seed, ground nut oil, tung oil, wood oil, ricinene oil or, preferably, sunflower oil, soya oil, castor oil, dehydrated castor oil, and the like. These oils or fatty acids can be used alone or as a mixture of one or more of the oils or fatty acids. Preferred fatty acids are soya fatty acids, dehydrated castor fatty acids, linolenic fatty acids, ricinoleic fatty acids, and linoleic fatty acids.

Suitable polyols useful in preparing a polyester or alkyd include compounds such as, for example, aliphatic, cycloaliphatic and/or araliphatic alcohols having 1 to 6, preferably 1 to 4, hydroxy groups attached to nonaromatic or aromatic carbon atoms. Examples of suitable polyols include, ethylene glycol, 1,2-propanediol, 1,3-propanediol, 1,2-butanediol, 1,3-butanediol, 1,4-butanediol, 2-ethyl-1,3-propanediol, 2-methylpropanediol, 2-butyl2-ethylpropanediol, 2-ethyl-1,3-hexanediol, 1,3 neopentyl glycol, 2,2-dimethyl-1,3-pentanediol, 1,6 hexanediol, 1,2- and 1,4-cyclohexanediol, bisphenol A, 1,2- and 1,4-bis(hydroxymethyl)cyclohexane, bis(4-hydroxycyclohexyl)-methane, adipic acid bis-(ethylene glycol ester), ether alcohols, such as diethylene glycol and triethylene glycol, dipropylene glycol, perhydrogenated bisphenols, 1,2,4-butanetriol, 1,2,6-hexanetriol, trimethylolethane, trimethylolpropane, trimethylolhexane, glycerol, pentaerythritol, dipentaerythritol, mannitol and sorbitol, and also chain-terminating monoalcohols having 1 to 8 carbon atoms such as propanol, butanol, cyclohexanol, benzyl alcohol, hydroxypivalic acid, and mixtures thereof.

The polybasic acids useful in preparing polyesters or alkyds include compounds such as, for example, aliphatic, cycloaliphatic saturated or unsaturated and/or aromatic polybasic carboxylic acids, such as, for example, dicarboxylic, tricarboxylic and tetracarboxylic acids. These compounds can be used alone or as a mixture of one or more polybasic acids. Suitable examples of polybasic acids include, for example, phthalic acid, isophthalic acid, adipic acid, terephthalic acid, tetrahydrophthalic acid, hexahydrophthalic acid, endomethylenetetrahydrophthalic acid, succinic acid, glutaric acid, sebacic acid, azelaic acid, trimellitic acid, pyromellitic acid, fumaric and maleic acid and the like, or mixtures thereof.

Polybasic acids, as used herein, are broadly defined to include anhydrides of the polybasic acids such as, for example, maleic anhydride, phthalic anhydride, succinic anhydride, tetrahydrophthalic anhydride, hexahydrophthalic anhydride, trimellitic anhydride, or mixtures thereof. These compounds can be used alone or as a mixture of one or more polybasic acids.

Suitable neutralizing bases to render the polyester or alkyd water dispersible include inorganic bases such as sodium hydroxide, potassium hydroxide, lithium hydroxide, ammonia, triethylamine, and dimethyl ethanol amine.

In addition to polymers having acetoacetyl functionality, coating compositions of the present invention also include ethylenically unsaturated compounds. Preferably, such compounds are multifunctional (i.e., include two or more ethylenically unsaturated groups), which makes them suitable crosslinkable diluents. Such compounds may be monomers, oligomers, polymers, or mixtures thereof.

Preferred such ethylenically unsaturated compounds include (meth)acrylate functionality (wherein "(meth)acrylate" refers to an acrylate and a methacrylate), vinyl functionality, vinyl ether functionality, (meth)allyl ether functionality (wherein (meth)allyl ether refers to an allyl ether and a methallyl ether), or mixtures thereof.

Coating compositions of the present invention can include one or more different ethylenically unsaturated compounds, preferably one or more (meth)acrylate monomers. Preferably, the (meth)acrylate monomers have two or more (meth)acrylate groups (i.e., they are multifunctional). The (meth)acrylate functional groups of the (meth)acrylate monomers are bonded to core structural groups, which may be based on a wide variety of organic structures including tripropylene glycol, isobornyl alcohol, isodecyl alcohol, phenoxyethyl alcohol, trishydroxyethyl isocyanurate, trimethylolpropane ethoxylate, hexanediol, ethoxylated and propoxylated neopentyl glycol, oxyethylated phenol, polyethylene glycol, bisphenol ethoxylate, neopentyl glycol propoxylate, trimethylolpropane, propoxylated glycerol, di-trimethylolpropane, pentaerythritol, tetrahydrofurfuryl alcohol, beta-carboxyethyl alcohol, substituted derivatives of the above, combinations of the above, and the like.

Examples of suitable (meth)acrylate monomers include isobornyl (meth)acrylate, isodecyl (meth)acrylate, phenoxyethyl (meth)acrylate, trimethylolpropane tri(meth)acrylate, trimethylolpropane ethoxylate tri(meth)acrylate, tripropylene glycol di(meth)acrylate, hexanediol di(meth)acrylate, tetrahydrofurfuryl (meth)acrylate, beta-carboxyethyl (meth)acrylate, bisphenol A ethoxylate di(meth)acrylate, ethoxylated and propoxylated neopentyl glycol di(meth)acrylates, di-(trimethyolpropane tetra (meth)acrylate), pentaerythritol tri(meth)acrylate, pentaerythritol tetra(meth)acrylate, or mixtures thereof.

Another example of a suitable ethylenically unsaturated compound is an allyl ether. Preferably, the allyl ether functional groups of the allyl ether monomers are bonded to a core structural group which is based on a wide variety of polyhydric alcohols. Suitable polyhydric alcohols include neopentyl glycol, trimethylolpropane, ethylene glycol, propylene glycol, butylene glycol, diethylene glycol, trimethylene glycol, triethylene glycol, trimethylolethane, pentaerythritol, glycerol, diglycerol, 1,4-butanediol, 1,6-hexanediol, 1,4-cyclohexanedimethanol, and the like. Various mixtures of such alcohols can be used, if desired.

Examples of suitable allyl ether monomers include hydroxyethyl allyl ether, hydroxypropyl allyl ether, trimethylolpropane monoallyl ether, trimethylolpropane diallyl ether, trimethylolethane monoallyl ether, trimethylolethane diallyl ether, glycerol monoallyl ether, glycerol diallyl ether, pentaerythritol monoallyl ether, pentaerythritol diallyl ether, pentaerythritol triallyl ether, 1,2,6-hexanetriol monoallyl ether, 1,2,6-hexanetriol diallyl ether, and the like. Propoxylated and ethoxylated forms of these compounds are also suitable.

Another example of a suitable ethylenically unsaturated compound is a vinyl ether. Examples of suitable vinyl ether monomers include 4-hydroxybutyl vinyl ether, 1,4-cyclohexanedimethanol monovinyl ether, 1,4-cyclohexanedimethanol divinyl ether, ethylene glycol monovinyl ether, ethylene glycol divinyl ether, diethylene glycol monovinyl ether, diethylene glycol divinyl ether, triethylene glycol divinyl ether, and the like. Propoxylated and ethoxylated forms of these compounds are also suitable.

The ethylenically unsaturated compounds may be used in various combinations and may also provide a crosslinkable diluent function to the coating compositions.

Coating compositions of the present invention preferably include an acetoacetyl-functional polymer in an amount of at least 30 wt-%, more preferably at least 45 wt-%, and even more preferably at least 55 wt-%, based on the combined weight of the ethylenically unsaturated compound and the acetoacetyl-functional polymer component of the composition. Coating compositions of the present invention preferably include an acetoacetyl-functional polymer in an amount of no more than 95 wt-%, more preferably no more than 90 wt-%, and even more preferably no more than 85 wt-%, based on the combined weight of the ethylenically unsaturated compound and the acetoacetyl-functional polymer component of the composition.

Thus, certain preferred coating compositions include 30 wt-% to 95 wt-% acetoacetyl-functional polymer, and in certain more preferred compositions include 55 wt-% to 85 wt-% acetoacetyl-functional polymer, based on the combined weight of the ethylenically unsaturated compound and the acetoacetyl-functional polymer component of the composition.

Coating compositions of the present invention preferably include an ethylenically unsaturated compound in an amount of at least 5 wt-%, more preferably in an amount of at least 7.5 wt-%, and even more preferably in an amount of at least 10 wt-%, based on the combined weight of the ethylenically unsaturated compound and the acetoacetyl-functional polymer component of the composition. Coating compositions of the present invention preferably include an ethylenically unsaturated compound in an amount of no more than 70 wt-%, more preferably in an amount of no more than 50 wt-%, and even more preferably in an amount of no more than 40 wt-%, based on the combined weight of the ethylenically unsaturated compound and the acetoacetyl-functional polymer component of the composition.

Other components of the coating compositions of the present invention include those typically used in paint formulations, such as pigments, fillers, thickeners, biocides, mildewcides, surfactants, dispersants, defoamers, and the like. Suitable additives for use in coating compositions of the present invention are described in Koleske et al., Paint and Coatings Industry, April, 2003, pages 12-86.

In particular, compositions including a latex polymer also include a dispersing agent, such as a nonionic or anionic surfactant, as described above. Such surfactants not only create a dispersion or emulsion of polymer particles in water, but assist incorporation of the ethylenically unsaturated compound.

Coating compositions of the present invention can include one or more initiators. Examples of suitable initiators include photoinitiators, thermal initiators, catalysts for auto-oxidative cure (e.g., manganese catalysts).

Certain embodiments of the present invention include polymers that are curable by UV or visible light. These coating compositions typically include a free-radical initiator, particularly a photoinitiator that induces the curing reaction upon exposure to light. The photoinitiator is preferably present in an amount of at least 0.1 wt-%, based on the total weight of the coating composition. The photoinitiator is preferably present in an amount of no greater than 10 wt-%, based on the total weight of the coating composition.

Among photoinitiators suitable for use in the present invention with resins having (meth)acrylate or allyl ether functional groups are alpha-cleavage type photoinitiators and hydrogen abstraction-type photoinitiators. The photoinitiator may include other agents such as a coinitiator or photoinitiator synergist that aid the photochemical initiation reaction. Suitable cleavage type photoinitiators include alpha, alpha-diethoxyacetophenone (DEAP), dimethoxyphenylacetophenone (commercially available under the trade designation IRGACURE 651 from Ciba Corp., Ardsley, N.Y.), hydroxycyclo-hexylphenylketone (commercially available under the trade designation IRGACURE 184 from Ciba Corp.), 2-hydroxy-2-methyl-1-phenylpropan-1-one (commercially available under the trade designation DAROCUR 1173 from Ciba Corp.), a 25:75 blend of bis-(2,6-dimethoxybenzoyl)-2,4,4-trimethylpentyl phosphine oxide and 2-hydroxy-2-methyl-1-phenylpropan-1-one (commercially available under the trade designation IRGACURE 1700 from Ciba Corp.), a 50:50 blend of 2-hydroxy-2-methyl-1-phenylpropan-1-one and 2,4,6-trimethylbenzoyl-diphenylphosphine oxide (TPO, commercially available under the trade designation DAROCUR 4265 from Ciba Corp.), phosphine oxide, 2,4,6-trimethyl benzoyl (commercially available under the trade name IRGACURE 819 and IRGACURE 819DW from Ciba Corp.), 2,4,6-trimethylbenzoyl-diphenylphosphine oxide (commercially available under the trade designation LUCIRIN from BASF Corp., Mount Olive, N.J.), and a mixture of 70% oligo 2-hydroxy-2-methyl-4-(1-methylvinyl)phenylpropan-1-one and 30% 2-hydroxy-2-methyl-1-phenylpropan-1-one) (commercially available under the trade designation KIP 100 from Sartomer, Exton, Pa.). Suitable hydrogen abstraction-type photoinitiators include benzophenone, substituted benzophenones (such as that commercially available under the trade designation ESCACURE TZT from Fratelli-Lamberti, sold by Sartomer, Exton, Pa.), and other diaryl ketones such as xanthones, thioxanthones, Michler's ketone, benzil, quinones, and substituted derivatives of all of the above. Preferred photoinitiators include DAROCUR 1173, KIP 100, benzophenone, and IRGACURE 184. A particularly preferred initiator mixture is commercially available under the trade designation IRGACURE 500 from Ciba Corp., which is a mixture of IRGACURE 184 and benzophenone, in a 1:1 ratio. This is a good example of a mixture of an alpha-cleavage type photoinitiator and a hydrogen abstraction-type photoinitiator. Other mixtures of photoinitiators may also be used in the coating compositions of the present invention. Camphorquinone is one example of a suitable photoinitiator for curing a coating composition with visible light.

A coating composition of the present invention can also include a coinitiator or photoinitiator synergist. The coinitiators can be tertiary aliphatic amines (such as methyl diethanol amine and triethanol amine), aromatic amines (such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate, (meth)acrylated amines (such as those commercially available under the trade designations EBECRYL 7100 and UVECRYL P104 and P115, all from UCB RadCure Specialties, Smyrna, Ga.), and amino-functional acrylate or methacrylate resin or oligomer blends (such as those commercially available under the trade designations EBECRYL 3600 or EBECRYL 3703, both from UCB RadCure Specialties). Combinations of the above categories of compounds may also be used.

Preferred photoinitiators include benzophenone, 4-methylbenzophenone, benzoyl benzoate, phenylacetophenones, 2,2-dimethoxy-2-phenylacetophenone, alpha,alpha-diethoxyacetophenone, hydroxycyclo-hexylphenylketone, 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one, 2,4,6-trimethylbenzoyl-diphenylphosphine oxide, and combinations thereof.

Preferred compositions include a free radical initiator that is a hydrogen abstraction-type photoinitiator. Preferably, the hydrogen abstraction-type photoinitiator is benzophenone or a 4-methylbenzophenone. Such compositions are at least partially curable by ultraviolet light.

Although not intended to be limiting, it is believed that the acetoacetyl-functional polymer likely participates in a free radical UV cure mechanism through hydrogen abstraction of the —C(O)—CH$_2$—C(O)— hydrogens through a benzophenone based initiation. If it occurs, this preferably takes place upon exposure to ultraviolet or visible light between 200 nm and 800 nm, and more preferably in the ultraviolet range of 200 nm to 400 nm.

The amount of hydrogen abstraction-type photoinitiator in such a composition is preferably at least 0.1 wt-%, more preferably at least 0.2 wt-%, and even more preferably at least 0.4 wt-%, based upon the total weight of the composition. The amount of hydrogen abstraction-type photoinitiator in such a composition is preferably no more than 4 wt-%, more preferably no more than 3 wt-%, and even more preferably no more than 2 wt-%, based upon the total weight of the composition.

Coating compositions having resins with vinyl ether functional groups can be cured by UV or visible light using cationic-generating photoinitiators. Examples of suitable cationic-generating photoinitiators include super acid-generating photoinitiators, such as triarylsulfonium salts. One useful triarylsulfonium salt is triphenyl sulfonium hexafluorophosphate.

Many coating compositions that may be cured by UV or visible light may also be cured with an electron beam. Techniques and devices for curing a coating composition using an electron beam are known in the art. These techniques do not require a photoinitiator for electron beam cure of the coating.

Coating compositions that include compounds with (meth)acrylate and/or allyl functional groups may also be thermally cured using a suitable initiator. The thermal initiator typically facilitates the curing process by a free radical mechanism and typically includes a peroxide or azo compound. Peroxide compounds suitable for use as initiators in the coating compositions of the present invention include t-butyl perbenzoate, t-amyl perbenzoate, cumene hydroperoxide, t-amyl peroctoate, methyl ethyl ketone peroxide, benzoyl peroxide, cyclohexanone peroxide, 2,4-pentanedione peroxide, di-t-butyl peroxide, t-butyl hydroperoxide, and di-(2-ethylhexyl)-peroxydicarbonate. Suitable azo compounds which may be employed as an initiator in the present compositions include 2,2-azo bis-(2,4-dimethylpentane-nitrile), 2,2-azo bis-(2-methylbutanenitrile), and 2,2-azo bis-(2-methylpropanenitrile).

For coating compositions having a mixture of (meth)acrylate, allyl ether, and vinyl ether functional groups, a combination of curing procedures may be used. For example, a coating composition having both (meth)acrylate and vinyl ether functional groups typically includes an alpha-cleavage type and/or hydrogen abstraction type photoinitiator for the (meth)acrylate groups and a cationic-generating photoinitiator for the vinyl ether groups.

Other methods for curing the coating compositions of the invention can be used alone or in combination with methods described hereinabove. Supplemental curing methods include heat cure, chemical cure, anaerobic cure, moisture cure, oxidative cure, and the like. Each method of cure requires a corresponding curing initiator or curing agent, which is included in the composition. For example, thermal cure can be induced by peroxides, metal drier packages can induce an oxidative cure, multifunctional amines (for example isophorone diamine) can effect a chemical cross-linking cure through Michael addition of amine groups onto acrylate reactive unsaturated groups. If these additional initiators are present in the coating composition they are preferably present in an amount of at least 0.1 wt-%, based on the weight of the coating composition. Preferably, they are present in an amount of no greater than 12 wt-%, based on the weight of the coating composition. Means for effecting cures by such methods are known to those of skill in the art or can be determined using standard methods.

Certain coating compositions of the present invention may also include one or more of a group of ingredients that can be called performance enhancing additives. Typical performance enhancing additives that may be employed include surface active agents, pigments, colorants, dyes, surfactants, thickeners, heat stabilizers, leveling agents, anti-cratering agents, curing indicators, plasticizers, fillers, sedimentation inhibitors, ultraviolet-light absorbers, optical brighteners, and the like to modify properties.

Coating compositions may include a surface-active agent that modifies the interaction of the curable coating composition with the substrate, in particular, the agent can modify the ability of the composition to wet a substrate. Surface active agents may have other properties as well. For example, surface active agents may also include leveling, defoaming, or flow agents, and the like. The surface active agent affects qualities of the curable coating composition including how the coating composition is handled, how it spreads across the surface of the substrate, and how it bonds to the substrate. If it is used, the surface active agent is preferably present in an amount of no greater than 5 wt-%, based on the total weight of the coating composition.

Surface active agents have also been found to assist incorporation as well as assist coating formulation. Surface active agents suitable for use in coating compositions are known to those of skill in the art or can be determined using standard methods. Exemplary surface active agents include polydimethylsiloxane surface active agents (such as those commercially available under the trade designations SILWET L-760 and SILWET L-7622 from OSI Specialties, South Charleston, W. Va., or BYK 306, BYK 333, and BYK 346 from Byk-Chemie, Wallingford, Conn.) and fluorinated surface active agents (such as that commercially available as FLUORAD FC-430 from 3M Co., St. Paul, Minn.). The surface active agents may include a defoamer. Suitable defoamers include polysiloxane defoamers (such as a methylalkylpolysiloxane like that commercially available under the trade designation BYK 077 or BYK 500 from Byk-Chemie) or polymeric defoamers (such as that commercially available under the trade designation BYK 051 from Byk-Chemie).

For some applications, a coating that is opaque, colored, pigmented or has other visual characteristics is desired. Agents to provide such properties can also be included in coating compositions of the present invention. Pigments for use with the present invention are known in the art. Suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, and/or organic yellows (such as Hansa yellow). The composition can also include a gloss control additive or an optical brightener, such as that commercially available under the trade designation UVITEX OB from Ciba-Geigy.

In certain embodiments it is advantageous to include fillers or inert ingredients in the coating composition. Fillers and inert ingredients include, for example, clay, glass beads, calcium carbonate, talc, silicas, organic fillers, and the like. Fillers extend, lower the cost of, alter the appearance of, or provide desirable characteristics to the composition before and after curing. Suitable fillers are known to those of skill in the art or can be determined using standard methods. Fillers or inert ingredients are preferably present in an amount of at least 0.1 wt-%, based on the total weight of the coating composition. Fillers or inert ingredients are preferably present in an amount of no greater than 40 wt-%, based on the total weight of the coating composition.

The invention may also include other ingredients that modify properties of the curable coating composition as it is stored, handled, or applied, and at other or subsequent stages. Waxes, flatting agents, mar and abrasion additives, and other similar performance enhancing additives may be employed in this invention as required in amounts effective to upgrade the performance of the cured coating and the coating composition. Desirable performance characteristics of the coating include chemical resistance, abrasion resistance, hardness, gloss, reflectivity, appearance, or combinations of these characteristics, and other similar characteristics.

The coating compositions of the present invention may be applied to a variety of substrates including wood, cement, cement fiber board, wood-plastic composites, tile, metal, plastic, glass, optical fibers, and fiberglass. Coating compositions can be applied to a substrate by a variety of methods known to those skilled in the art. Such methods include spraying, painting, rollcoating, brushing, fan coating, curtain coating, spreading, air knife coating, die-coating, vacuum coating, spin coating, electrodeposition, and dipping.

The thickness of the coatings will vary with the application. Typically, the coatings will have a thickness of 0.1 mil to 20 mils (0.00025 centimeter (cm) to 0.0508 cm), however, thicker or thinner coatings are also contemplated depending on, for example, the desired coating properties.

The present invention also provides methods for coating that involve applying a coating composition to a substrate and allowing the coating composition to harden (e.g., by exposing the coating composition to radiation such as ultraviolet or visible light). The present invention also provides coatings prepared or preparable from the coating compositions described herein. For example, a coating of the present invention is preparable by a method that involves applying a coating composition of the present invention to a substrate and allowing the coating composition to harden (e.g., by exposing the coating composition to radiation such as ultraviolet or visible light).

Preferred coatings are cured by exposing the coating to radiation having a wavelength in the range of $10^{-3}$ nm to 800 nm. More preferably, coating compositions of the present invention are exposed to ultraviolet or visible light in the range of 200 nm to 800 nm. Coating compositions of this invention may also be cured by thermal means or other forms of radiation such as, for example, electron beam.

Preferred coatings, which are designed to be cured by ultraviolet or visible light, are preferably exposed to 100 Mjoules/cm$^2$ to 5000 Mjoules/cm$^2$, more preferably exposed to 300 Mjoules/cm$^2$ to 2000 Mjoules/cm$^2$, and even more preferably exposed to 500 Mjoules/cm$^2$ to 1750 Mjoules/cm$^2$.

A preferred method includes: providing a coating composition that includes: water; a polymer that includes one or more acetoacetyl-functional groups of the formula:

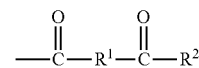

wherein R$^1$ is a C1 to C22 alkylene group and R$^2$ is a C1 to C22 alkyl group; and a (meth)acrylate functional compound distinct from the polymer having acetoacetyl functionality; optionally an initiator (preferably a photoinitiator); applying the coating composition to a substrate surface; and at least partially curing the coating composition.

Another embodiment of the method includes: providing a coating composition that includes: water; a polymer including one or more acetoacetyl-functional groups of the formula:

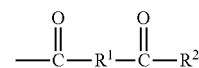

wherein R$^1$ is a C1 to C22 alkylene group and R$^2$ is a C1 to C22 alkyl group; and an ethylenically unsaturated compound distinct from the polymer having acetoacetyl functionality; a photoinitiator; applying the coating composition to a substrate surface; and applying ultraviolet or visible light to the coating composition to at least partially cure the coating composition.

EXAMPLES

The following examples are offered to aid in understanding of the present invention and are not to be construed as limiting the scope thereof. Unless otherwise indicated, all parts and percentages are by weight.

Reagents:

DMPA—Dimethylolpropionic acid (GEO, Allentown, Pa.)

TMPTA—Trimethylolpropane triacrylate (Sartomer, Exton, Pa.)

EOTMPTA—Ethoxylated trimethylol propane triacrylate (Sartomer, Exton, Pa.)

4-HBA—4-Hydroxy butylacrylate (Aldrich, Milwaukee, Wis.)

TMP—Trimethylol Propane (Aldrich)

DESMOPHEN S-105-110—Polyester diol (Bayer, Pittsburgh, Pa.)

TEA—Triethyl Amine (Aldrich)

DBTDL—Dibutyl Tin Dilaurate (Air Products, Allentown, Pa.)

RHODAPON UB—Sodium Lauryl Sulfate (Rhodia, Cranbury, N.J.)

RHODAPON UB—Sodium Lauryl Sulfate (Rhodia, Cranbury, N.J.)

RHODAPEX CO-436—Nonylphenol Ethoxylated, Sulfate, NH3 Salt (Rhodia, Cranbury, N.J.)

IPA—Isophthalic Acid (Amoco, Chicago, Ill.)

AA—Adipic Acid (Aldrich Chemical, Milwaukee, Wis.)

TMA—Trimellitic Anhydride (Aldrich Chemical, Milwaukee, Wis.)

NPG—Neopentyl Glycol (Aldrich Chemical, Milwaukee, Wis.)

DPG—Dipropylene Glycol (Aldrich Chemical, Milwaukee, Wis.)

AAEM—2-(acetoacetoxy) ethyl methacrylate (Aldrich Chemical, Milwaukee, Wis.)

t-BAcAc—t-butyl acetoacetate (Aldrich Chemical, Milwaukee, Wis.)

NMP—n-methylpyrrolidinone (Aldrich Chemical, Milwaukee, Wis.)

Example 1: Preparation of an Acetoacetyl-Functional Latex Polymer

A reactor is charged with 775.2 parts of deionized water and 18.4 parts CO-436. The reaction mixture is heated to 75° C. under a nitrogen blanket. During heating, a premulsion is formed comprising: 336.4 parts of deionized water, 12.2 parts CO-436, 0.8 parts ammonium persulfate, 370.0 parts of butyl acrylate, 190.2 parts of methyl methacrylate, 118.3 parts of styrene, 78.9 parts AAEM and 31.5 parts of methacrylic acid. Once the reaction mixture reaches 75° C., 5% of the preemulsion is added to the reactor followed by the addition of a mixture of 2.4 parts of ammonium persulfate and 7.5 parts of water. The reaction is held 5-10 minutes, whereupon an exotherm results and then the remaining preemulsion is fed into the reactor vessel over 2 hours. The reaction temperature is held between 80° C. and 85° C., during polymerization. Once the preemulsion feed is complete, the container is rinsed with 20 parts of deionized water and the reaction is held 30 minutes. Once the 30 minute hold is complete, the resulting latex polymer is cooled to 40° C. and a 28% concentrate ammonia is added to adjust the pH to 7.0-7.5 and deionized water is added to adjust the weight solids to 40%.

Example 2: Preparation of a Ultraviolet Curable Acetoacetyl-Functional Coating Composition Under agitation to a stainless steel mixing vessel is added 100 grams of deionized water, 14.2 grams of RHODAPAN UB, and 200 grams EOTMPTA. The mixture is blended until a pre-emulsion forms.

Under agitation to a stainless steel mixing vessel is added 1000 grams of latex polymer from Example 1, 93 grams of deionized water, and 157 grams of the EOTMPTA preemulsion prepared above. This mixture is then held under agitation for 8 hours until the EOTMPTA migrates into the latex polymer. Fifteen (15) grams of IRGACURE 500 is then added to the mixture and held under agitation for another 15 minutes. The mixture is then left overnight to allow the release of any entrapped air.

The resulting mixture will cure to a hard, chemically resistant finish upon exposure to ultraviolet light. The resulting mixture from Example 2 will also cure to a hard, chemically resistant finish without the need of photoinitiator under electron beam radiation.

Example 3: Preparation of (Meth)Acrylate Functional Polyurethane Dispersion (PUD) with TMPTA Reactive Diluent A reactor is charged with 96.0 parts TMPTA, 48.0 parts 4-HBA, 91.4 parts DESMOPHEN S-105-110 polyester diol, 29.3 parts DMPA, 9.6 parts TMP, 258.9 parts isophorone diisocyanate, and 500 ppm of 2,6 di-tert-butyl-4-methylphenol. The reaction mixture is heated to 80° C. under an air sparge, where upon 250 ppm DBTDL is added and the reaction processed until the isocyanate level is below 9.2%. The urethane polymer is cooled to 65° C. and then neutralized with 22.1 parts TEA. The urethane polymer viscosity at 65° C. will be less than 6,000 centipoise (cps) as measured by a Brookfield DV-I+ Viscometer and a Number 31 spindle at 1.5 revolutions per minute (RPM).

At a process temperature of 65° C., the (meth)acrylate urethane polymer formed above is then dispersed into 895.5 parts room temperature deionized water and subsequently chain extended with 51.1 parts hydrazine (35% in water). The dispersion is then adjusted to 35% solids with deionized water.

The physical properties of the chain extended (meth) acrylate functional polyurethane dispersion are as follows (NVM %=nonvolatile material by weight):

| | EXAMPLE 1 |
|---|---|
| NVM % | 35% |
| % VOC | 1.4% (TEA) |

Example 4: Preparation of a Ultraviolet Curable Acetoacetyl-Functional Coating Composition Under agitation to a stainless steel mixing vessel is added 100 grams of deionized water, 14.2 grams of Rhodapon UB, and 200 grams EOTMPTA. The mixture is blended until a pre-emulsion forms.

Under agitation to a stainless steel mixing vessel is added 800 grams of latex polymer from Example 1, 200 grams of the polymer from Example 3, 93 grams of deionized water, and 157 grams of the EOTMPTA preemulsion prepared above. This mixture is then held under agitation for 8 hours until the EOTMPTA migrates into the latex polymer. Fifteen (15) grams of IRGACURE 500 is then added to the mixture and held under agitation for another 15 minutes. The mixture is then left overnight to allow the release of any entrapped air.

The resulting mixture will cure to a hard, chemically resistant finish upon exposure to ultraviolet light. The resulting mixture from Example 4 will also cure to a hard, chemically resistant finish without the need of photo initiator under electron beam radiation.

Example 5: Preparation of Acetoacetyl-Functional Water Dispersible Polyester A reactor is charged with 383.9 parts IPA, 135.5 parts AA, 383.9 parts DPG, 101.6 parts TMP and 1500 ppm of Fascat 4100 tin catalyst from Elf Atochem. The reaction mixture is slowly heated 235° C. and stirred for about 4 hours and water is removed. The mixture is heated and tested until a sample has an acid number of less than 20 mg of KOH/gram. At which point 79 parts t-BAcAc is added and held at 235° C. while removing methanol. Once methanol stops coming off, the mixture is cooled to 200° C. and 45.2 parts TMA is added. The reaction is held at 190° C. and tested until the acid number is 40-45 mg of KOH/gram. Once the acid number is 40-45 mg of KOH/gram, the reaction is cooled to 100° C., and air sparge is begun and 1000 ppm MEHQ is added along with 333 grams EOTMPTA. To this mixture is added 45 parts of 28% ammonia and 2400 parts deionized water. As the water is added, the mixture is allowed to cool to room temperature and the solids are adjusted to 35%.

Example 6: Preparation of a Ultraviolet Curable Acetoacetyl-Functional Coating Composition Fifteen (15) grams of IRGACURE 500 is added to 1500 grams of the mixture from Example 5 and held under agitation for another 15 minutes. The mixture is then left overnight to allow the release of any entrapped air.

The resulting mixture will cure to a hard, chemically resistant finish upon exposure to ultraviolet light. The resulting mixture from Example 6 will also cure to a hard, chemically resistant finish without the need of photo initiator under electron beam radiation.

Example 7: Preparation of an Acetoacetyl-Functional Latex Polyer

A reactor was charged with 522.6 parts of deionized water, 1.8 parts RHODAPON UB. The reaction mixture was heated to 75° C. under a nitrogen blanket. During heating, a premulsion was formed comprising: 299.9 parts of deionized water, 57.4 parts of RHODAPON UB, 0.7 part ammonium persulfate, 156.6 parts of butyl acrylate, 176.0 parts of butyl methacrylate, 463.8 parts of styrene, 44.0 parts AAEM, and 39.6 parts of methacrylic acid. Once the reaction mixture reaches 75° C., 5% of the preemulsion was added to the reactor followed by the addition of a mixture of 2.0 parts of ammonium persulfate and 8.1 parts of water. The reaction was held for 5 minutes to 10 minutes, whereupon an exotherm results and then the remaining pre-emulsion was fed into the reactor vessel over 2 hours. The reaction temperature was held between 80° C. and 85° C., during polymerization. Once the preemulsion feed was complete, the container was rinsed with 9 parts of deionized water and the reaction was held 30 minutes. As the prepolymer became viscous, 100 parts additional deionized water was added. Once the 30 minute hold was complete, the resulting latex polymer was cooled to 40° C. and a 28% concentrate ammonia was added to adjust the pH to 7.0-7.5 and deionized water was added to adjust the weight solids to 45%.

Example 8: Comparative Example—Preparation of a Non Acetoacetyl-Functional Latex Polymer A reactor was charged with 521.9 parts of deionized water, 3.0 parts RHODAPON UB. The reaction mixture was heated to 75° C. under a nitrogen blanket. During heating, a premulsion was formed comprising: 300.5 parts of deionized water, 56.1 parts of RHODAPON UB, 0.7 pars ammonium persulfate, 179.7 parts of butyl acrylate, 176.0 parts of butyl methacrylate, 484.8 parts of styrene, and 39.6 parts of methacrylic acid. Once the reaction mixture reaches 75° C., 10% of the preemulsion was added to the reactor followed by the addition of a mixture of 2.0 parts of ammonium persulfate and 8.1 parts of water. The reaction was held for 5 minutes to 10 minutes, whereupon an exotherm results and then the remaining preemulsion was fed into the reactor vessel over 2 hours. The reaction temperature was held between 80° C. to 85° C., during polymerization. Once the preemulsion feed was complete, the container was rinsed with 9 parts of deionized water and the reaction was held 30 minutes. As the prepolymer became viscous, 30 parts additional deionized water was added. Once the 30 minute hold was complete, the resulting latex polymer was cooled to 40° C. and a 28% concentrate ammonia was added to adjust the pH to 7.0-7.5 and deionized water was added to adjust the weight solids to 45%.

Example 9: Test Comparison of the Latex Polymers from Examples 7 and 8

The following compositions were prepared and allowed to mix for 8 hours. At which point 1% IRGACURE 500, based on the total weight of the composition, was added to each sample and the samples were allowed to sit overnight to release any trapped air.

| Components | COMPOSITION A | COMPOSITION B |
| --- | --- | --- |
| Latex from Example 7 | 50 grams | |
| Latex from Example 8 | | 50 grams |
| Water | 6 grams | 6 grams |
| EOTMPTA | 6 grams | 6 grams |
| NMP | 1 gram | 1 gram |

Physical Testing

A 3-mil thick (0.00762-cm) wet film was then applied to a Leneta Form 7B test chart and air dried for 15 minutes followed by force dry for 5 minutes at 65° C. The dried (meth)acrylate polymer film was then cured by mercury ultraviolet lamps. Total UV exposure was 1000 millijoules per square centimeter (mj/cm$^2$).

Performance properties are outlined below. Gloss is reported in accordance with ASTM test specification, D-523. All other cured film properties are reported on a scale of 1-10, with 10 being no effect or best.

| TEST | COMPOSITION A | COMPOSITION B |
| --- | --- | --- |
| MEK 2× Rubs | >100 | <100 |

MEK double rub testing was performed in accordance with ASTM test method D-5402. Composition A only showed surface marring after 100 MEK double rubs while composition B showed lower chemical resistance and showed film failure and breakthrough to the substrate at 100 double rubs.

Having thus described the preferred embodiments of the present invention, those skilled in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:
1. A coating composition consisting of:
    water;
    a latex polymer stabilized with an alkali-soluble polymer;
    wherein the alkali-soluble polymer is derived from greater than 10% by weight of one or more polymerizable acid monomers;
    wherein the latex polymer comprises one or more acetoacetyl-functional groups of the formula:

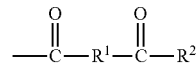

wherein R¹ is a C1 to C22 alkylene group and R² is a C1 to C22 alkyl group;
trimethylolpropane ethoxylate tri(meth)acrylate; and
a hydrogen abstraction-type photoinitiator; wherein the hydrogen abstraction-type photoinitiator is selected to cure the acetoacetyl-functional latex polymer via a free radical UV cure mechanism through hydrogen abstraction of the —C(O)—CH$_2$—C(O)— hydrogens;
wherein the coating composition does not include a multifunctional amine crosslinker.

2. The coating composition of claim 1 comprising no more than 10 wt-% volatile organic compounds, based on the total weight of the composition.

3. The coating composition of claim 1 wherein the acetoacetyl-functional polymer comprises an acetoacetyl-functional polyurethane, epoxy, polyamide, chlorinated polyolefin, acrylic, oil-modified polymer, polyester, or mixtures or copolymers thereof.

4. The coating composition of claim 1 wherein the acetoacetyl-functional polymer comprises an acetoacetyl-functional latex polymer prepared from ethylenically unsaturated monomers.

5. The coating composition of claim 4 wherein the latex polymer comprises particles having an average particle size of less than 75 nm.

6. The coating composition of claim 1 wherein the acetoacetyl-functional group is incorporated into the latex polymer using 2-(acetoacetoxy) ethyl methacrylate, t-butyl acetoacetate, diketene, or combinations thereof.

7. The coating composition of claim 1 wherein the hydrogen abstraction-type photoinitiator is benzophenone or 4-methylbenzophenone.

8. The coating composition of claim 7 which is at least partially curable by ultraviolet or visible light.

9. A method of coating a substrate, the method comprising applying the coating composition of claim 1 to a substrate and allowing the coating composition to harden.

10. A coating on a substrate preparable by the method of claim 9.

11. The coating composition of claim 1 wherein trimethylolpropane ethoxylate tri(meth)acrylate is present in an amount of at least 5 wt-%, based on the combined weight of trimethylolpropane ethoxylate tri(meth)acrylate and the acetoacetyl-functional polymer.

12. The coating composition of claim 11 wherein the acetoacetyl-functional polymer is present in an amount of at least 30 wt-% and no more than 95 wt-%, and trimethylolpropane ethoxylate tri(meth)acrylate is present in an amount of at least 5 wt-% and no more than 70 wt-%, based on the combined weight of trimethylolpropane ethoxylate tri(meth)acrylate and the acetoacetyl-functional polymer.

13. The coating composition of claim 11 wherein trimethylolpropane ethoxylate tri(meth)acrylate is present in an amount of at least 7.5 wt-%, based on the combined weight of trimethylolpropane ethoxylate tri(meth)acrylate and the acetoacetyl-functional polymer.

14. The coating composition of claim 11 wherein trimethylolpropane ethoxylate tri(meth)acrylate is present in an amount of at least 10 wt-%, based on the combined weight of trimethylolpropane ethoxylate tri(meth)acrylate and the acetoacetyl-functional polymer.

15. The coating composition of claim 1 wherein the latex polymer is distinct from the alkali-soluble polymer.

16. A method of coating a substrate surface, the method comprising:
providing a coating composition consisting of:
water;
a latex polymer stabilized with an alkali-soluble polymer;
wherein the alkali-soluble polymer is derived from greater than 10% by weight of one or more polymerizable acid monomers;
wherein the latex polymer comprises one or more acetoacetyl-functional groups of the formula:

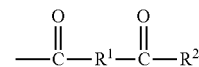

wherein R¹ is a C1 to C22 alkylene group and R² is a C1 to C22 alkyl group;
an ethylenically unsaturated compound distinct from the polymer comprising acetoacetyl functionality; wherein the ethylenically unsaturated compound is a monomer, oligomer, or mixture thereof comprising a multifunctional (meth)acrylate-functional monomer selected from the group consisting of isobornyl (meth)acrylate, isodecyl (meth)acrylate, phenoxyethyl (meth)acrylate, trimethylolpropane tri(meth)acrylate, trimethylolpropane ethoxylate tri(meth)acrylate, tripropylene glycol di(meth)acrylate, hexanediol di(meth)acrylate, tetrahydrofurfuryl (meth)acrylate, beta-carboxyethyl (meth)acrylate, bisphenol A ethoxylate di(meth)acrylate, ethoxylated neopentyl glycol di(meth)acrylate, propoxylated neopentyl glycol di(meth)acrylate, di-(trimethylolpropane tetra (meth)acrylate), pentaerythritol tri (meth)acrylate, pentaerythritol tetra(meth)acrylate, and mixtures thereof;
and
optionally an initiator;
applying the coating composition to a substrate surface; and
at least partially curing the coating composition.

17. The method of claim 16 wherein the coating composition comprises no more than 10 wt-% volatile organic compounds, based on the total weight of the composition.

18. The method of claim 16 wherein the acetoacetyl-functional polymer comprises an acetoacetyl-functional polyurethane, epoxy, polyamide, chlorinated polyolefin, acrylic, oil-modified polymer, polyester, or mixtures or copolymers thereof.

19. The method of claim 16 wherein the latex polymer comprises particles comprising the acetoacetyl-functional polymer, the alkali-soluble polymer, and the ethylenically unsaturated monomer, oligomer, or mixture thereof.

20. The method of claim 19 wherein the latex polymer comprises particles having an average particle size of less than 75 nm.

21. The method of claim 16 wherein the acetoacetyl-functional polymer is present in an amount of at least 30 wt-% and no more than 95 wt-%, based on the combined weight of ethylenically unsaturated monomer, oligomer, or mixture thereof and the acetoacetyl-functional polymer, and wherein the ethylenically unsaturated monomer, oligomer, or mixture thereof is present in an amount of at least 5 wt-% and no more than 70 wt-%, based on the combined weight of the ethylenically unsaturated monomer, oligomer, or mixture thereof and the acetoacetyl-functional polymer.

22. The method of claim 16 wherein the acetoacetyl functionality is incorporated into the latex polymer using 2-(acetoacetoxy) ethylmethacrylate, t-butyl acetoacetate, or diketene.

23. The method of claim 16 wherein the initiator is present in the latex polymer and comprises a photoinitiator, wherein the photoinitiator comprises benzophenone, 4-methylbenzophenone, benzoyl benzoate, phenylacetophenones, 2,2-dimethoxy-2-phenylacetophenone, alpha,alpha-diethoxyacetophenone, hydroxycyclo-hexylphenylketone, 2-hydroxy-2-methyl-1-phenylpropan-1-one, bis-(2,6-dimethoxybenzoyl)-2,4,4-trimethylpentyl phosphine oxide, 2,4,6-trimethylbenzoyl-diphenylphosphine oxide, or combinations thereof.

24. The method of claim 16 wherein the initiator is present in the latex polymer and comprises a photoinitiator, wherein the photoinitiator is a hydrogen abstraction-type photoinitiator.

25. The method of claim 24 wherein the hydrogen abstraction-type photoinitiator is benzophenone or 4-methylbenzophenone.

26. The method of claim 16, the method comprising exposing the coating composition to ultraviolet or visible light.

27. A coating on a substrate preparable by the method of claim 26.

28. The method of claim 16 wherein the initiator is present in the latex polymer and comprises a photoinitiator; and wherein at least partially curing the coating composition comprises applying ultraviolet or visible light to the coating composition.

29. The method of claim 16 wherein the ethylenically unsaturated monomer, oligomer, or mixture thereof is present in an amount of at least 5 wt-%, based on the combined weight of the ethylenically unsaturated monomer, oligomer, or mixture thereof and the acetoacetyl-functional polymer.

30. The method of claim 29 wherein the ethylenically unsaturated monomer, oligomer, or mixture thereof is present in an amount of at least 7.5 wt-%, based on the combined weight of the ethylenically unsaturated monomer, oligomer, or mixture thereof and the acetoacetyl-functional polymer.

31. The method of claim 30 wherein the ethylenically unsaturated monomer, oligomer, or mixture thereof is present in an amount of at least 10 wt-%, based on the combined weight of the ethylenically unsaturated monomer, oligomer, or mixture thereof and the acetoacetyl-functional polymer.

32. The method of claim 16 wherein the latex polymer is distinct from the alkali-soluble polymer.

33. A coating composition consisting essentially of:
water;
a latex polymer stabilized with an alkali-soluble polymer;
  wherein the alkali-soluble polymer is derived from greater than 10% by weight of one or more polymerizable acid monomers;
  wherein the latex polymer comprises one or more acetoacetyl-functional groups of the formula:

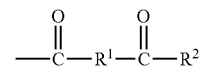

wherein $R^1$ is a C1 to C22 alkylene group and $R^2$ is a C1 to C22 alkyl group; and
trimethylolpropane ethoxylate tri(meth)acrylate; and
a hydrogen abstraction-type photoinitiator; wherein the hydrogen abstraction-type photoinitiator is selected to cure the acetoacetyl-functional latex polymer via a free radical UV cure mechanism through hydrogen abstraction of the —C(O)—CH$_2$—C(O)— hydrogens;
wherein the coating composition does not include a multifunctional amine crosslinker.

* * * * *